Sept. 1, 1931. E. J. MURRAY 1,821,764
ADJUSTABLE WING SAFETY DEVICE FOR AIRCRAFT
Filed Aug. 30, 1929 6 Sheets-Sheet 3

Sept. 1, 1931.  E. J. MURRAY  1,821,764
ADJUSTABLE WING SAFETY DEVICE FOR AIRCRAFT
Filed Aug. 30, 1929  6 Sheets-Sheet 6
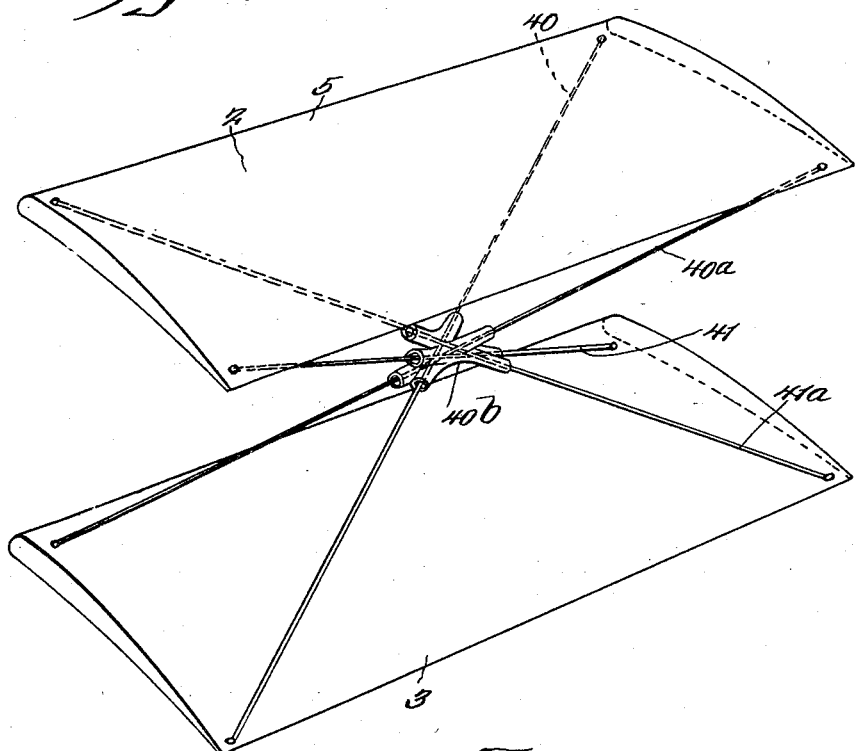
Fig. 6.
Fig. 7.
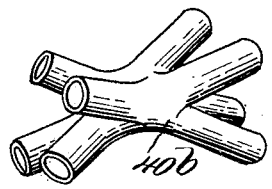
Edward J. Murray
INVENTOR
BY Victor J. Evans
his ATTORNEY Patented Sept. 1, 1931

1,821,764

UNITED STATES PATENT OFFICE

EDWARD J. MURRAY, OF GLENSIDE, PENNSYLVANIA

ADJUSTABLE WING SAFETY DEVICE FOR AIRCRAFT

Application filed August 30, 1929. Serial No. 389,477.

This invention relates to the art of aircrafts, and the purpose of the invention is to provide, in connection with an aircraft improved wings of safety character and construction.

It is well known that in connection with aircraft tail spins or nose dives are dangerous, very often resulting in the death of the occupants of the aircraft, therefore it is the purpose of the present invention to provide, in an aircraft, wings capable of being moved to assume positions relative to each other, to form a V, so that in case of a tail spin or a nose dive, the V will pocket the air, and thereby act to retard the craft considerably in its descent, and thereby safeguard against serious accidents and very often prevent death to those in the craft.

Another purpose is to provide in an aircraft an improved mounting for the wings, so as to permit them to be adjusted to form a V.

Still another purpose is to provide means for adjusting the wings.

A further purpose is to provide, in an aircraft an arrangement and construction of flying and landing wires, which also have characteristics of incident wires, namely such wires as to reinforce the wings in any of its positions, and particularly when in flying positions.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:

Figure 6 is a perspective view of portions of two wings disposed for a single bay.

Figure 7 is an enlarged detailed view of the casting through which the flying and landing wires pass.

Figure 1:
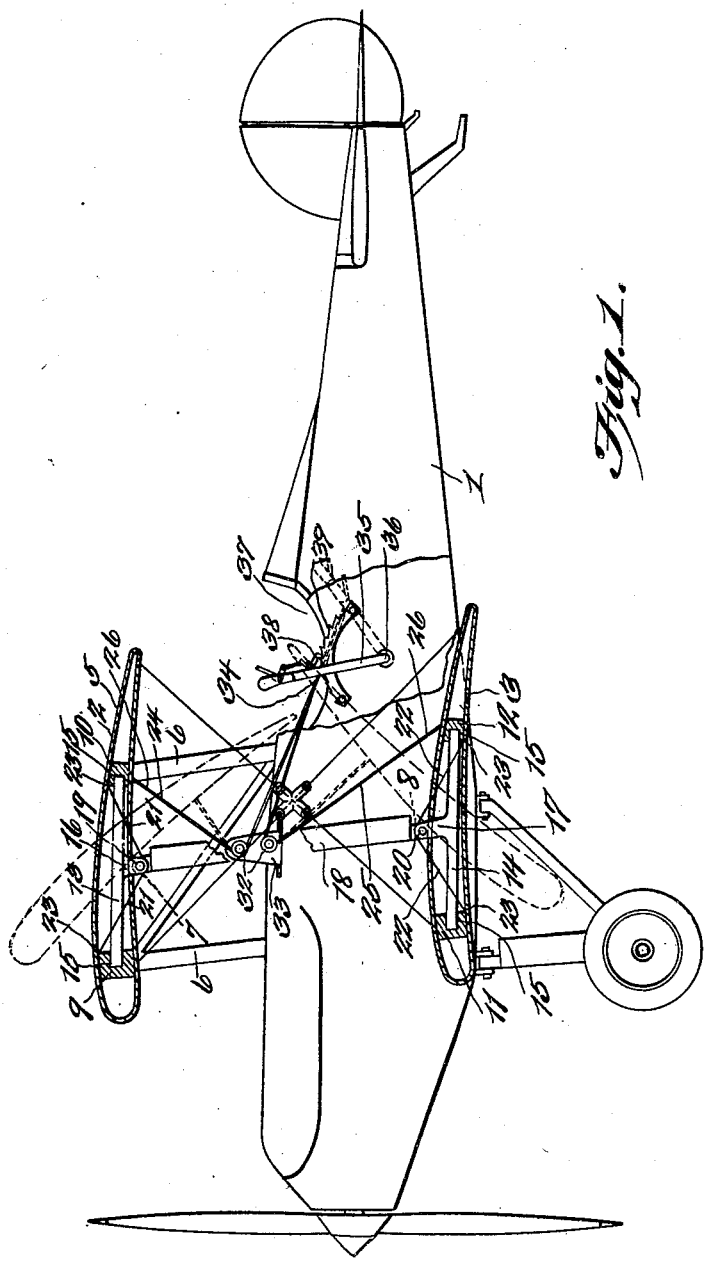
Figure 1 is a view in side elevation of an aircraft of a biplane type, illustrating the invention as applied, and showing the fuselage broken away, showing the wing control operating means.

Referring to the drawings 1 identifies a fuselage of an aircraft, which may be any suitable type of construction, whereas the whole craft may be of any conventional design, either the biplane or monoplane character, and if the present invention is applied to a monoplane design, such design may be of the kind entitled commercially the Bullet, wherein the single wing stretches from the lower portion of the fuselage nearer the nose thereof, and wherein the landing gear is extensible.

Figure 2:
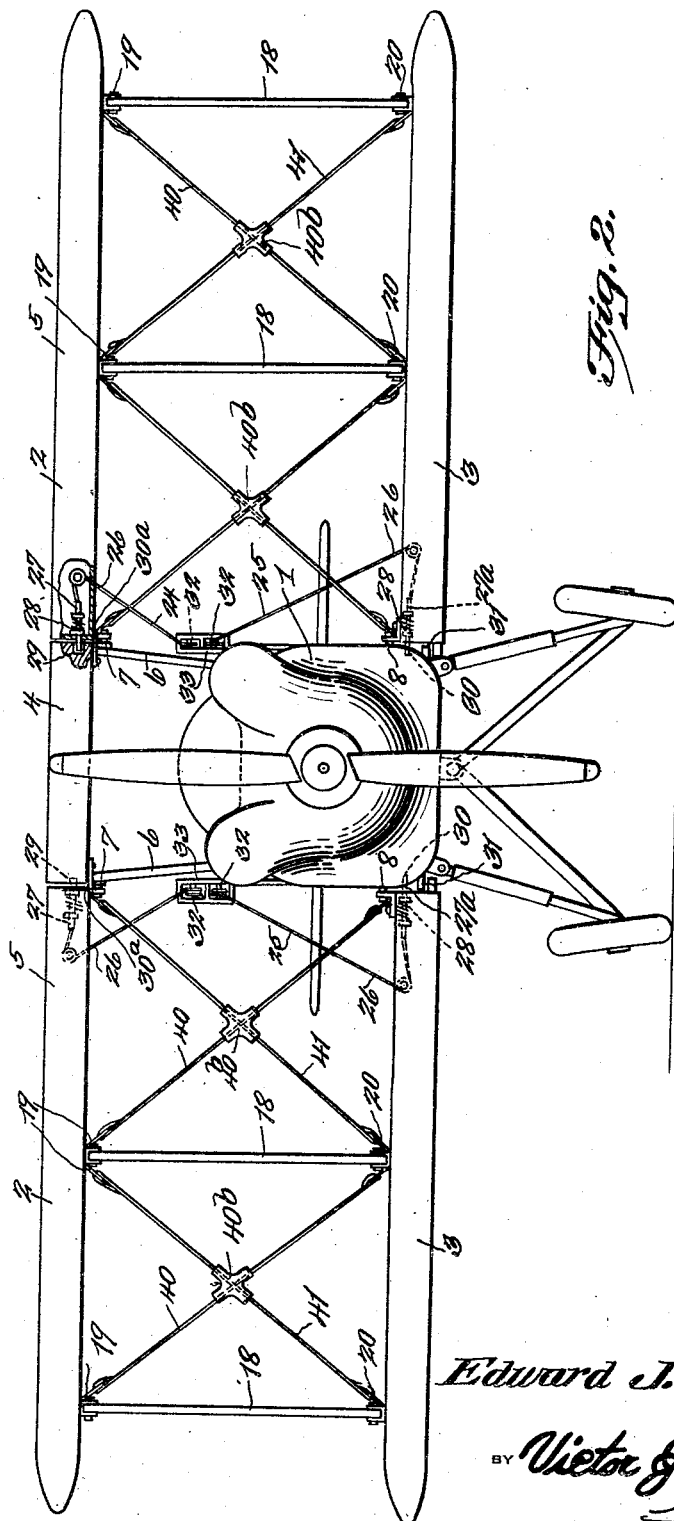
Figure 2 is a view in front elevation of the aircraft disclosed in Figure 1.
Figure 3:
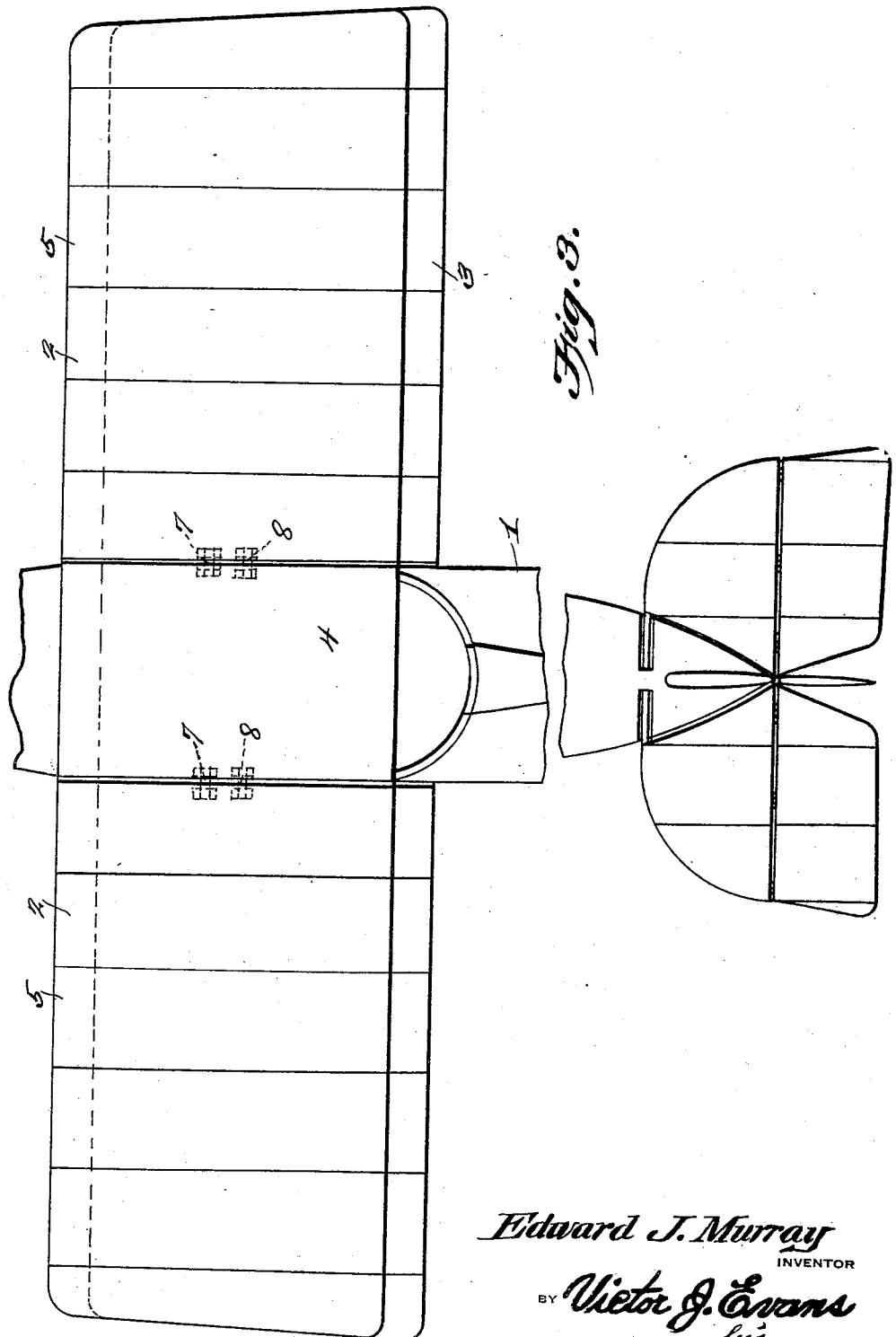
Figure 3 is a plan view.

In the present case, referring to Figures 1, 2, 3 and 6 the craft as disclosed is of the biplane type, therefore the upper and lower wings 2 and 3 are positioned as in Figures 1 and 2. The lower wing 3 extends laterally from the lower forward portion of the fuselage, while the upper wing 2 stretches across the upper portion of the fuselage and spaced therefrom. The upper wing comprises the usual center section 4 and the end sections 5. The center section 4 is supported relative to the fuselage in stable position by means of the struts 6, which rise from the fuselage.

The wings are of lengths to provide four bays, two on each side of the fuselage, though not necessarily, for the reason that there may be only one bay on each side of the fuselage. The end sections of the upper wing are pivoted at 7, while the lower wing sections are pivoted at 8 to the fuselage.

While these wing sections may be of any conventional or well known type, that is in construction internally, they include forward and rear wing beams 9 and 10, and 11 and 12, and also compression members or brace bars 13 and 14, the ends of which are received and secured in recesses 15 of the wing beams in any suitable manner not shown. The compression members or brace bars 13 and 14 have lateral extensions 16 and 17, which extend toward each other and carry pivots 19 and 20, which unite the wing sections to the struts 18, which are interposed between the wing sections. The pivots 19 and 20 are axially aligned with the pivots 7 and 8, so that when the wing sections are adjusted to the position shown in dotted lines in Figure 1, proper movements of the wings and their stability during such adjustments are assured.

Suitable brace or strut wires 21 and 22 are connected at 23 in any suitable manner not shown to the wing beams, and are in turn connected in any suitable manner, not shown, to the extensions 16 and 17, thereby reinforcing the wing structures relative to the extensions 16 and 17.

It is obvious that the end wing sections are capable of adjustment on their pivots 7 and 8 and 19 and 20, and to accomplish this cables or wires 24 and 25 are provided. These wires or cables have their end portions 26 connected to sliding retainers 27 and 27a which are mounted internally at 28 of the wing sections, which are designed to engage in keepers 29 and 30 on the center wing sections 4 of the fuselage 1. Said retainers act to hold the wing sections in position rigidly relative to the center wing section and the fuselage during flying. Shoulders 30a and 31 are provided on the center wing section and on the sides of the fuselage, against which the wing sections engage to insure limiting them when disposed in flying positions.

The other ends of the cables or wires 24 and 25 subsequently to passing over pulleys 32 carried by uprights 33 are attached at 34 to levers 35 pivoted at 36 on the interior of the pilot's cockpit 37. The levers are so disposed on opposite sides of the cockpit as to be convenient to the pilot to insure their operation. Each lever 35 has a hand grip operated dog 38 to cooperate with a rack quadrant 39 to hold the lever in different adjusted positions. When it is desired to adjust the wing sections so as to dispose them in the position shown in dotted lines in Figure 1 in order that they may assume positions relative to each other to form a V-shaped pocket, the lever is pulled rearwardly, imparting movement upon the cables or wires 24 and 25. Prior to the cables or wires 24 and 25 actuating the wing sections, the retainers, due to the pulling action on said wires or cables are withdrawn from their keepers, hence unlatching the wing sections, permitting them to be adjusted, so that they can assume the dotted line positions in Figure 1.

Referring to Figures 1 and 2 it will be noted that the wing sections are reinforced relative to each other. In other words the wing sections are connected together by means of flying and landing wires 40, 40a and 41 and 41a. The flying wires 40 and 40a connect the upper wing sections adjacent their forward and rear edges and to the lower forward and rear edges of the lower wing sections at diagonal opposite points, while the landing wires 41 and 41a connect to the upper wing sections adjacent their forward and rear edge portions and incline downwardly and laterally and diagonally and connect to the lower wing sections adjacent their forward and rear edges. Each pair has two flying wires and two landing wires, each making a pair, as will be understood from Figures 1 and 2. These flying and landing wires are so arranged and constructed as to function as incident wires, due to their intersecting, and the manner in which they connect the diagonal opposite portions of the wing sections.

It is obvious that should the aircraft take a nose dive or a tail spin, the pilot may immediately adjust the wing sections to the position shown in dotted lines in Figure 1, thereby pocketing the air in the V-shaped spaces between the two sections, and hence act to sustain the craft sufficiently to break its fall, and thereby permit the craft to descend at a relatively safe speed.

Figure 4:
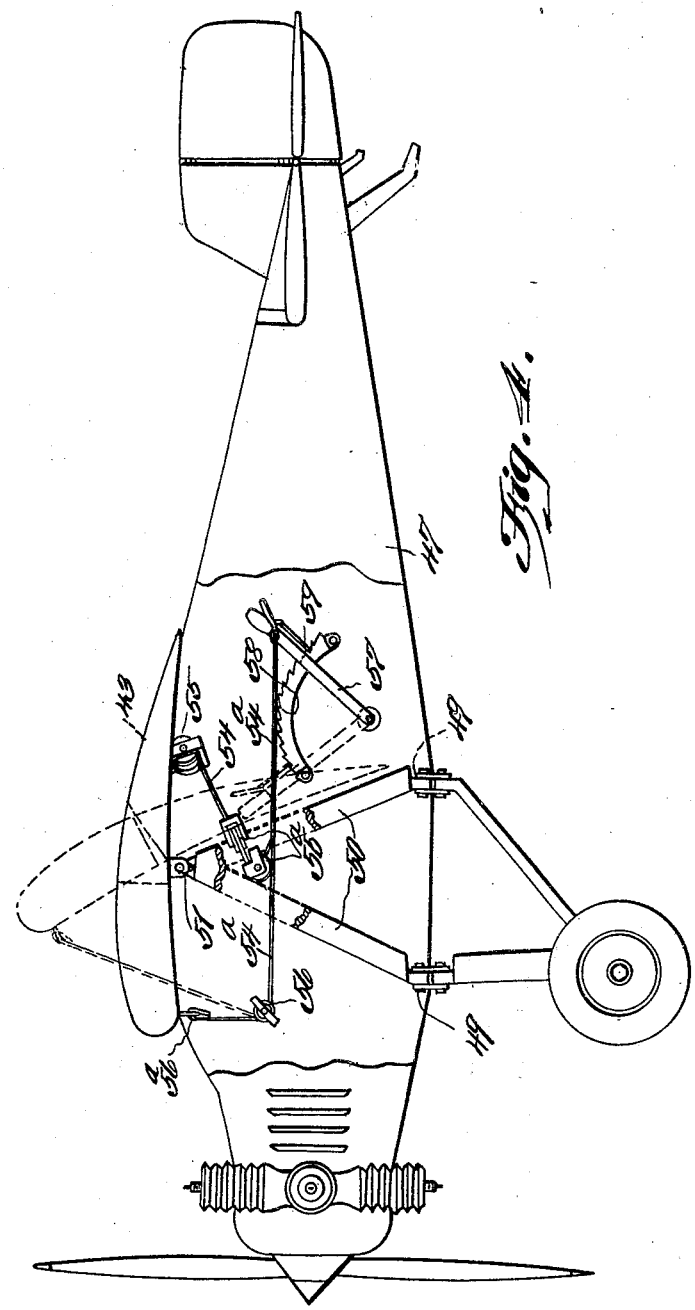
Figure 4 is a view in side elevation of an aircraft of a monoplane type, illustrating the means for adjusting the single wing.
Figure 5:
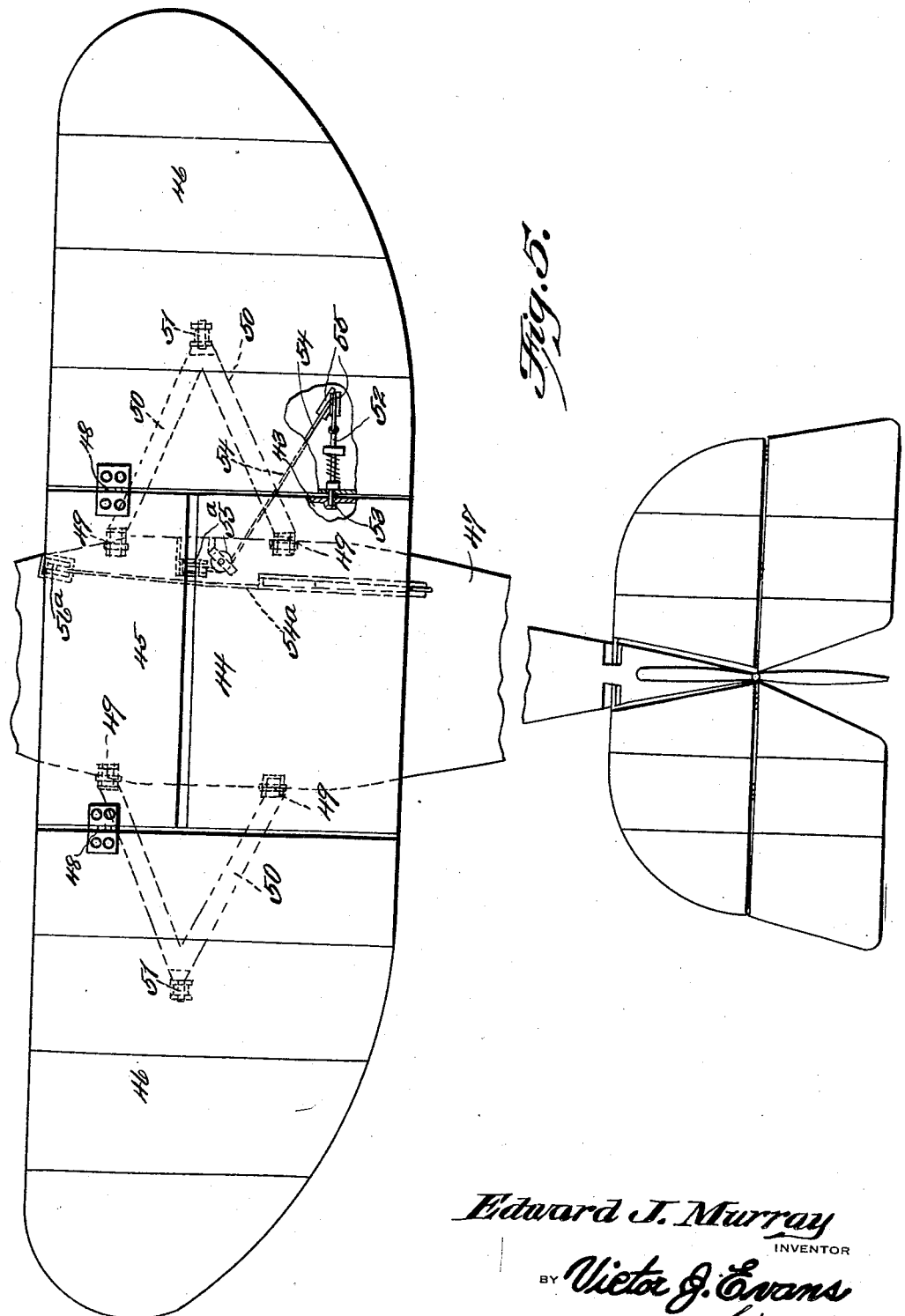
Figure 5 is a plan view of Figure 4.

Referring to Figures 4 and 5 it is to be noted that an aircraft of the monoplane type is disclosed, wherein the fuselage is provided with a single wing. This single wing comprises the center section 43 (which consists of two parts 44 and 45) and the end sections 46. The part 44 of the center section is rigid with the fuselage 47, while the part 45 of the center section is made movable with the end sections 46 through the medium of the fastening means 48 connecting the part 45 and the end sections. Rising from the lower portion of the fuselage as at 49 adjacent where the landing gear depends from the fuselage are struts 50 to which the end sections of the wing are pivoted at 51, so that the end sections may oscillate in order to assume the positions shown in dotted lines in Figure 4, that is when it is desired to break the fall of the aircraft should it turn into a nose dive or a tail spin.

In order to hold the end sections in flying position suitable retainers 52 are provided. These retainers are slidable and are designed to engage keepers 53 carried by the part 44 of the center section.

Suitable cables 54 are attached to the retainers and pass over pulleys 55 adjacent the rear edge of the end sections, over the pulleys 55a and are attached to the cables 54a. These cables 54a engage over the pulleys 56 near the forward part of the fuselage and are attached at 56a to the forward edge of the end wing sections, while the rear ends of the two cables 54a are attached to the levers 57. The levers 57 are pivoted in the cockpit of the fuselage and cooperate with a toothed quadrant 58, there being a hand grip operated dog 59 to cooperate with the quadrant for the purpose of adjusting the wing sections, as will be hereinafter understood.

In order to operate the end wing sections the lever is first pulled sufficiently to release the retainers from the keepers, then the lever is allowed to move forwardly gradually, and due to the wind or air striking under the forward parts of the wing, the air tends toward operating the wing until it assumes the position shown in dotted lines, and in which position the retainers may then engage other keepers, (not shown) hence locking the wing. When the wing assumes the position shown in dotted lines in Figure 4 and the craft turns into a nose dive or tail spin, the air operates under the wing and tends toward breaking the fall of the craft in its downward descent.

Under normal flying conditions, that is to say when the craft has not entered a nose dive or a tail spin but is properly landing, the wing sections may be adjusted to the angles shown in dotted lines in Figure 1, that is after reaching the ground, also pocketing the air, and thereby retarding the forward travel of the craft. By this arrangement a pilot would be better to make what is known as spot landings.

It is to be noted that the flying and landing wires pass through castings, so that when the end wing sections are operated to the positions shown in dotted lines in Figure 1, the flying and landing wire will move through the castings, the wires still remaining taut, for the reason that if it were not for the castings 40b, such flying and landing wires when the wing sections are adjusted to the dotted line positions, certain of the wires would slacken or become loose.

The invention having been set forth, what is claimed is:

1. In an aircraft, the combination with a fuselage, of a pair of wings comprising end sections, center supports, on which the end sections are pivotally mounted for movement of the end sections to positions crossing the fuselage transversely, whereby the end wing sections may assume positions to form a V, in which the air may be pocketed for breaking the fall of the craft, retainers carried by the end wing sections and keepers carried by the center supports to receive said retainers, and means to actuate the retainers to release said end wing sections.

2. In an aircraft, the combination with a fuselage, of upper and lower wings, the lower wing comprising end sections, the upper wing comprising an intermediate stationary wing section and two end sections, the upper and lower end sections being pivotally mounted on axis transversely of the fuselage, inter-secting landing and flying wires connecting the upper and lower end sections for retaining the end wing sections in normal flying positions, and means operatively connecting with the end wing sections for operating them on their pivots to dispose them in positions to form a V, in which the air may be pocketed for braking the fall of the craft, and means for holding the end wing sections in such adjusted positions.

3. In an air craft as set forth, the combination with a fuselage, of upper and lower wings, the lower wing comprising end wing sections pivoted on an axis transversely of the fuselage, the upper wing comprising a central stationary wing section and two end wing sections pivoted on an axis extending transversely of the central wing section, flying and landing wires connecting the end sections, whereby when one end wing section is moved the other end wing section moves, said flying and landing wires inter-secting each other, a guide for the intersecting portions of said wires, and means connecting with the end wing sections for moving and disposing them in positions to form a V, in which the air may be pocketed for braking the fall of the craft.

4. In an aircraft, a fuselage, a wing operatively mounted on the fuselage, said wing comprising a central fixed section and two end wing sections, the entire wing being positioned transversely of the fuselage, the end wing sections being pivoted to assume positions at angles to the central fixed section, the central fixed wing section having keepers, tension devices carried by the end wing sections for engagement with the keepers to prevent pivotal movement of the end wing sections, manually operative mechanism including cable connections with the tension devices for releasing them from the keepers and at the same time pivotally actuating the end wing sections.

In testimony whereof he affixes his signature.

EDWARD J. MURRAY.